3,175,973
ANTI-WEAR LUBRICANT COMPOSITION
Allen F. Millikan, Crystal Lake, and Gifford W. Crosby, River Forest, Ill., assignors to The Pure Oil Company, Chicago, Ill., a corporation of Ohio
No Drawing. Filed June 13, 1960, Ser. No. 35,398
8 Claims. (Cl. 252—46.4)

This invention relates to new and useful lubricant compositions containing a small amount of certain novel phosphorothioate ester compositions in an amount sufficient to enhance the antiwear properties of the lubricant.

In particular, this invention is based upon our discovery that lubricant compositions having unexpectedly superior antiwear properties may be prepared by incorporating in a lubricating oil a small amount of an arylphosphorothioate neutral ester composition having a sulfur-to-phosphorus ratio in excess of 2.0. The phosphorothioate ester compositions which are used as antiwear additives in the lubricant composition of this invention are reaction products produced by reaction of benzyl alcohol, substituted benzyl alcohol, or compounds which react to produce substituted benzyl alcohol (e.g., phenol and formaldehyde) with phosphorus pentasulfide or with dialkyl or diaryl esters of phosphorodithioic acid. The reaction of these compounds has been found to result in the formation of a two-phase reaction product which is allowed to settle and the upper, oil-soluble phase, recovered as the desired phosphorothioate ester composition. The preparation of these novel phosphorothioate ester compositions and the compositions per se is disclosed in our prior copending applications Serial No. 685,390, now Patent No. 3,102,130, filed September 23, 1957, Serial No. 702,256, now Patent No. 3,005,006, filed December 12, 1957, and Serial No. 738,267, now Patent No. 2,996,533, filed May 28, 1958, of which this application is a continuation-in-part.

It is one object of this invention to provide new and improved lubricant compositions having superior antiwear properties.

Another object of this invention is to provide new and improved lubricating oil compositions containing novel phosphorus- and sulfur-containing antiwear additives.

A feature of this invention is the provision of an improved lubricating oil composition containing a neutral arylmethyl ester of a phosphorothioic acid having a sulfur-to-phosphorus ratio in excess of 2.0.

Another feature of this invention is the provision of an improved lubricating oil composition containing a small amount of a phosphorothioate ester composition produced by reaction of benzyl alcohol, substituted benzyl alcohol, or compounds which react to form substituted benzyl alcohol, with phosphorus pentasulfide or a dialkyl or diaryl ester of phosphorodithioic acid, said ester composition having a sulfur-to-phosphorus ratio in excess of 2.0 and comprising a mixture of phosphorotrithioate esters, phosphorotetrathioate esters, and condensed phosphorothioate esters.

Other objects and features of this invention will become apparent from time to time throughout the specification and claims as hereinafter related.

This invention is based upon our discovery that lubricant compositions having exceptional antiwear properties may be prepared by incorporating in a lubricating oil a small amount (preferably about 0.005–1.0% by weight of phosphorus) of phosphorothioate ester compositions having sulfur-to-phosphorus ratios in excess of 2.0, which are prepared by reaction of benzyl alcohol, or substituted benzyl alcohol, or compounds which react to produce substituted benzyl alcohol, with phosphorus pentasulfide or dialkyl or diaryl phosphorodithioic acid esters. The preparation of the novel phosphorus- and sulfur-containing antiwear additive and novel lubricant compositions containing the same are set forth in the following non-limiting examples.

EXAMPLE I

A reaction flask, equipped with a stirrer and thermometer, and supported over a steam bath, was charged with 216 g. (2.0 gram mols) of benzyl alcohol, 111 g. (0.5 gram mol) of phosphorus pentasulfide, 216 g. of 85 vis./100 V.I. neutral oil, and 260 ml. of toluene. The reaction mixture was heated to 90° C. and stirred for one hour, at which time a vigorous exothermic reaction began. Even though the steam bath was removed, the temperature of the reaction mixture rose to 125° C. and remained there for 15 minutes. After the evolution of heat had ceased, steam heating and stirring were resumed and continued for another 15 minutes, after which the mixture was allowed to cool. An appreciable amount of solid material was precipitated as a result of the reaction.

Supernatant liquid was removed from the mixture and the solid material was extracted by stirring with 200 ml. of a 50/50 ethanol/toluene mixture. All of the liquids were then composited and mixed with an additional 200 ml. of toluene, after which the resulting liquid was stripped with nitrogen, under vacuum, to remove ethanol and toluene. The stripped residue separated into two phases, the upper phase having relatively low acidity and the lower phase having relatively high acidity. The upper phase weighed 550 g., and contained 2.5 wt. percent phosphorus and 9.5 wt. percent sulfur. The phosphorus in this phase amounted to about 45% of the phosphorus initially charged as phosphorus pentasulfide. The sulfur/phosphorus atomic ratio in this phase was 3.7/1, while that of the expected dibenzyl phosphorodithioic acid would have been only 2/1. Acidity of this phase amounted to 0.5 equivalent per phosphorus atom, whereas the acidity of the expected dibenzyl phosphorodithioic acid would have been 1 equivalent per phosphorus atom. The lower phase, on the other hand, had an acid equivalent of almost 2 per phosphorus atom and a sulfur content amounting to less than 10% of the charged sulfur.

As previously pointed out, this reaction is completely anomalous and cannot be satisfactorily explained due to the complexity of the reaction products. One possible explanation for this reaction, which would account for the distribution of acid values, is that dibenzyl phosphorodithioic acid is formed as an intermediate and disproportionates into a tetrathioate ester, or polymer thereof, which is the recovered upper oil-soluble layer, and benzyl dihydrogen phosphate is the lower water-soluble layer. This theory of the reaction, however, has not been proved since the products are of a somewhat polymeric nature and could not be identified as specific compounds. The oil-soluble, sulfur-containing phase is therefore referred to as a phosphorothioate ester which is substantially neutral and has a high sulfur-to-phosphorus atomic ratio, in the rang from 3.0 to 10/1.

EXAMPLE II

In another experiment, benzyl alcohol and phosphorus pentasulfide were reacted over a steam bath in a mol ratio of 6/1, in the same manner described in Example I. The resulting oil-soluble product was isolated as an upper liquid phase in the same manner as previously described and was found to contain sulfur and phosphorus in an atomic ratio of 4.0/1 and had an acidity of only 0.1 equivalent per phosphorus atom.

EXAMPLE III

In still another experiment, 3.0 mols of benzyl alcohol were added to a stirred, boiling mixture of benzene, mineral oil, and 0.5 mol of phosphorus pentasulfide. During the addition period of one hour and for one additional hour of reaction time, benzene was allowed to distill off slowly. The product which was recovered after stripping off the diluent liquid had a composition corresponding to dibenzyl phosphorodithioic acid in mineral oil solution. This material was held at 25° to 30° C. for a period of three months and separated into two phases. The upper phase was an oily liquid, soluble in oil, and had a sulfur-phosphorus atomic ratio of about 3.2/1. This phase represented 88.5% by weight of the total reaction product, contained 55% by weight of the phosphorus charged and 91% by weight of the sulfur charged, and had an acid equivalent of 0.4. An analysis of the lower phase showed that the total acidity of both phases represented 100% of the charged acidity, thus indicating that the reaction is a disproportionation, rather than a hydrolysis by extraneous moisture.

EXAMPLE IV

Benzyl alcohol and phosphorus pentasulfide, in a 6/1 mol ratio, were reacted in the manner described in Example III, to produce a composition having an analysis corresponding roughly to dibenzyl phosphorodithioic acid. This reaction product (or mixture of reaction products) was heated at 80° C. for periods of 5 hours, 15 hours, and 72 hours, respectively. When this reaction product was heated, it was found to divide into two phases as previously described. The upper phase was recovered as an oily, oil-soluble product having very low acidity and a high sulfur-to-phosphorus ratio. The product obtained after heating for 5 hours had an acid equivalent per atom of phosphorus of 0.2, and a sulfur-to-phosphorus atomic ratio of 3.6. The product obtained after 15 hours had an acid equivalent per atom of phosphorus of 0.1 and a sulfur-to-phosphorus atomic ratio of 4.0. The product obtained after 72 hours had a sulfur/phosphorus atomic ratio of 9.2. These data indicate that the initial reaction of benzyl alcohol and phosphorus pentasulfide produces an intermediate reaction product which disproportionates to an oxygen-containing acid and a neutral polymeric ester of phosphorotetrathioic acid. This ester is apparently complex and contains some polymerization products which makes separation of a pure compound difficult, if not impossible. At elevated temperatures, the phosphorotetrathioate ester composition apparently disproportionates further and eliminates a further acid phase in the form of a condensed acid, or an ester of a condensed acid, leaving a sulfur-rich phase which apparently is a phosphorothioate ester composition containing some polysulfide linkages or possibly containing separate polysulfide compounds in admixture therewith.

EXAMPLE V

In still another experiment, 3 mols of benzyl alcohol were added to 0.5 mol of phosphorus pentasulfide in 350 ml. of toluene at 90° C. over a period of 3.5 hours. After an additional 1.5 hours at the same temperature, the product was stripped of solvent under vacuum and the residue found to settle into two liquid phases. The two liquid phases were separated, the upper phase being a substantially neutral, oily, oil-soluble liquid, and the lower phase being a syrupy acid. The upper phase consisted of 307 g. of oily liquid, containing 3.9% phosphorus by weight, representing 39% of the phosphorus charged. This liquid contained 77% of the sulfur charged, had a sulfur-phosphorus atomic ratio of 4.0/1, and an acid equivalent per atom of phosphorus of 0.1. The lower phase was a syrupy liquid and weighed 96 g. This liquid contained 23.0% phosphorus by weight, which represented 61% of the charged phosphorus. The sulfur/phosphorus atomic ratio in this liquid was only 0.1, representing 4% of the charged sulfur, and had an acid equivalent per atom of phosphorus of 1.8.

Our experiments indicate that when benzyl alcohol and phosphorus pentasulfide are reacted in a mol ratio not less than about 4 to 1, at a temperature of 20°–130° C.

there is produced a mixture of reaction products which settle into two liquid phases. The upper phase is recovered as an oily phosphorothioate ester, of uncertain molecular composition, which is soluble in oil, has a sulfur-to-phosphorus atomic ratio in the range of 3.0–10/1 (depending upon the temperature of the reaction), and an acid equivalent per atom of phosphorus of less than 0.5. The preferred reaction conditions for producing these ester compositions require a benzyl alcohol/phosphorus pentasulfide mol ratio of 4–6/1, at a temperature of 80°–125° C. for a period of 1 to 5 hours. The product, under these conditions, is a substantially neutral, oil-soluble ester composition having a sulfur/phosphorus atomic ratio of about 4/1.

The phosphorothioate ester compositions which are produced by this process have been found to have unexpectedly superior properties when used as antiwear additives for lubricating oil compositions. These ester compositions (the neutral oily phase of the reaction product), when added to lubricating oils to produce a phosphorus concentration in the oil in the range of 0.005–1.0%, have been found to reduce wear of moving parts lubricated therewith to an unexpected degree. To demonstrate the superiority of lubricating compositions including small amounts of the product of this process, a number of lubricant compositions were prepared using a mineral lubricating oil base and various additives to demonstrate the antiwear properties thereof. These oil compositions were tested in the Shell Four-Ball EP Test Apparatus under a 20 kg. load, at 1800 r.p.m., for 5 minutes at room temperature. Under these conditions of load, the balls are elastically deformed at point of contact to produce a circular area of contact, between each of the balls, having a diameter of 0.236 mm. The measure of resistance of an oil to wear (i.e., the antiwear properties thereof) is the ability of the oil to prevent formation of a wear scar having a diameter greater than the initial diameter of the circular area of contact or elastic indentation. To illustrate the significance of this wear test, a solvent-refined 170 vis., 100 V.I. neutral oil was used to lubricate the balls in the Four-Ball Test Apparatus. At the end of the test period, under the conditions above described, the balls were found to have circular scars which were 0.376 mm. in diameter. These scars were enlarged by 0.140 mm. in diameter over the diameter of elastic indentation, an increase of more than 50% in scar diameter. In evaluating the performance of antiwear additives in lubricating oils, various oil compositions are measured in the Four-Ball Test Apparatus and the size of the wear scars compared. Since the wear scar can never be smaller in diameter than the elastic indentation, the comparison of wear using different lubricants is best made by measuring the increase in scar diameter over the diameter of elastic indentation. Oils which have superior antiwear properties will, of course, produce scars having a smaller increase in diameter than oils which do not provide wear protection. A number of oil compositions were prepared and tested using a 170 vis., 100 V.I. neutral oil base, the results being reported in Table I as follows:

*Table I*

| Antiwear Additive | S/P Ratio in Additive | Percent P in Blend | Average Increase in Scar Diameter Over Diameter of Elastic Indentation, mm. × 10³ |
|---|---|---|---|
| Phosphorothioate ester composition produced according to Example I. | 3.7 | 0.11 / 0.05 | 40 / 40 |
| Phosphorothioate ester composition produced according to Example IV. | 6.6 | 0.04 / 0.02 | 40 / 50 |
| Tribenzyl Phosphorotetrathioate. | 4 | 0.10 / 0.05 | 110 / 80 |
| None | | | 140 |

In another series of experiments these antiwear additives were evaluated using a lubricating oil base containing a detergent and a V.I. improver, which are used in detergent-type lubricating oils and which impart some antiwear properties to such oils. In these tests, the lubricant base consisted of:

| | Wt. percent |
|---|---|
| 170/100 V.I. neutral oil | 83.1 |
| Extract from phenol extraction of 85/100 V.I. neutral oil | 4.8 |
| Barium phenol sulfide-calcium sulfonate | 5.7 |
| Acryloid 618 (acrylic polymer manufactured by Rohm & Haas, Inc.) | 6.4 |

This lubricating oil composition was evaluated for antiwear properties without antiwear additives, and with various phosphorus- and sulfur-containing compounds added in concentrations such that 0.1 wt. percent phosphorus was contained in each blend. The testing of these compounds was conducted in a Four-Ball EP Machine as in the other tests. The tests were carried out using a 20 kg. load, at 1800 r.p.m. for 5 minutes. As in the other experiments, the wear of the balls is expressed as the differences between the diameter of elastic indentation and the diameter of the circular scar produced during the test. The results of several tests are shown in Table II as follows:

*Table II*

| Antiwear Additive (In an amount sufficient to produce phosphorus concentration of 0.1%) | Average increase in scar diameter over initial diameter of elastic indentation, mm. × 10³ |
|---|---|
| None | 44 |
| O,O'-Diamyl phosphorodithioic acid | 48 |
| 1-Phenylethyl O,O'-diamyl phosphorodithioate | 53 |
| Benzyl O,O'-diamyl phosphorodithioate | 33 |
| Commercial zinc dialkyl phosphorodithioate composition | 37 |
| Product of Example I (having S/P atomic ratio of 3.7) | 29 |

The above data show quite clearly that phosphorothioate ester compositions are not at all uniform or predictable in their ability to impact antiwear properties to lubricating oils. From the above table, it is seen that two phosphorothioate esters actually decrease the antiwear properties of the detergent-type lubricating oil base, while two other esters made some improvement in antiwear properties.

While most alcohols and phenols are reported in the literature not to react with dialkyl or diaryl phosphorodithioic acids to produce neutral triesters, we have found that it is possible to carry out the reaction of benzyl alcohol or a substituted benzyl alcohol with dialkyl or diaryl phosphorodithioic acids. This reaction of benzyl alcohol and its derivatives with dialkyl or diaryl phosphorodithioic acids is unusual in that it apparently results in the production of the desired neutral ester of S/P ratio greater than 2.0 and a highly acidic, water-soluble by-product. When the product and by-product are separated, by gravity separation in some cases and by water-washing or centrifuging in other cases, the water-insoluble phase is recovered as a neutral phosphorothioate ester composition having unusual properties. This product has a sulfur-to-phosphorus ratio greater than about 2.0, usually in the range of 2–4/1, and is substantially neutral. The product is apparently a mixture of phosphorotrithioates and phosphorotetrathioates and condensation products or polymers thereof. This product has been found to enhance the antiwear properties of lubricating oils to an unexpected and unpredictable degree when incorporated therein in a small proportion. The preparation of these phosphorothioate esters and lubricant compositions containing the same is described more fully in the following non-limiting examples.

EXAMPLE VI

A 250 ml. flask was charged with 37 g. (0.20 mol) of O,O'-diethyl phosphorodithioic acid and 67.8 g. (0.63 mol) of benzyl alcohol and heated over steam, with stirring. A gentle stream of nitrogen gas bubbled through the reaction mass to remove any gaseous or low-boiling by-products. The reaction was continued at 90° to 95° C. for 20 hours, during which time hydrogen sulfide was evolved continuously. The temperature of the reaction is not critical within the range of about 20° to 160° C. except for variations in the time required for carrying out the reaction. At lower temperatures the reaction becomes excessively slow. At temperatures above 160° C., the reaction is highly exothermic and difficult to control. By the end of 20 hours of reaction at 90° to 95° C., the reaction product had formed as two liquid phases which separated into two distinct layers. The upper phase was a mobile liquid, weighing 27 g. and was substantially neutral (having an acid number less than 7). This product was more soluble in oil than the O,O'-diethyl phosphorodithioic acid from which it was formed, contained 4.6% phosphorus and 15.6% sulfur, and had a S/P ratio of 3.3. The lower phase of the reaction product had the appearance of a polymeric material, was water-soluble, and oil-insoluble, and had an acid number greater than 325. This material contained 10.2% phosphorus and 6.8% sulfur, or a S/P ratio of 0.64. Simple esterification of the phosphorodithioic acid with benzyl alcohol would give a neutral product with a sulfur/phosphorus ratio of 2 to 1. The experimentally obtained ratio of 3.3 to 1 is indicative of disproportionation and formation of triesters of phosphorotrithioic acid and phosphorotetrathioic acid, together with condensation and polymerization products thereof. On the basis of phosphorus content of the O,O'-diethyl phosphorodithioic acid charged, the yield of combined phosphorus in our new product was about 19%.

EXAMPLE VII

O,O'-diphenyl phosphorodithioic acid was prepared by charging 442 g. (4.70 mols) of phenol, 443 g. of 85 vis., 100 V.I. neutral oil, and 450 ml. of toluene to a two-liter flask equipped with motor-driven stirrer and thermometer, and mounted over steam. As the mixture was stirred and heated (90°–95° C.), 260 g. (1.17 mols) of phosphorus pentasulfide were added over a five-minute period. After sixteen hours, the reaction appeared to be complete as evidenced by clearing of the solution. Acidity measurements indicated that 2.6 mols of acid had been formed (compared with 2.4 mols in theory).

Fifty-five hundreds mol of the O,O'-disphenyl phosphorodithioic acid produced above, 238 g. (2.20 mol) of benzyl alcohol, and 200 ml. of toluene were charged to a liter flask equipped with motor-driven stirrer and thermometer, and mounted over steam. The reaction mixture was stirred for 35 hours at 90°–95° C. At the end of this time, the reaction was stopped, and the product separated into three phases. The upper phase appeared to be largely neutral oil. The middle phase (338 g.) had an acid content of 0.32 mol (as indicated by acid number). The lower phase (10 g.) was water-soluble and of high acidity. A portion of the middle phase was water-washed. The resulting emulsion was resolved by centrifuging. The final product was an oily liquid, heavier than water which after water-washing had an S/P ratio of about 2/1.

EXAMPLE VIII

O,O'-di-2-ethylhexyl phosphorodithioic acid was prepared by stirring 520.2 g. (4.0 mols) of 2-ethylhexanol, 522.1 g. of 85 vis., 100 V.I. neutral oil, 500 ml. of toluene, and 222.3 g. (1.0 mol) of phosphorous pentasulfide at 90° C. for 4 hours. Reaction was complete at the end of this time, as evidenced by the disappearance of solids. The product was filtered, the filtrate weighing 1610 g. Acidity measurements indicated that 1.96 mols of acid had been formed (compared to a theoretical yield of 2.0 mols). The analysis of the product was: theory, 3.9 wt. percent P, 8.0 wt. percent S; found: 3.8 wt. percent P, 7.8 wt. percent S.

One hundred sixty-four and four/tenths grams (0.204 mol) of the acid so prepared, and 110.5 g. (1.02 mols) of benzyl alcohol were charged to a one-liter flask equipped with thermometer and motor-driven stirrer. The flask was partially immersed in an oil bath heated over a hot plate. The reaction mixture was stirred for 6.5 hours at 130°–150° C. An attempt to bring about phase separation by chilling was unsuccessful. A portion of the product was water-washed, and the resulting emulsion was resolved by centrifuging, yielding an oil-soluble product of reduced acidity and increased sulfur/phosphorus ratio. A portion of this product was in turn water-washed and the resulting emulsion again resolved by centrifuging. The oil-soluble material was found to be further reduced in acidity, and of increased S/P ratio. The product from the second water-washing weighed 161.1 g. and had an S/P ratio of 2.8. Continued water-washing would probably reduce the acidity to zero and further increase the S/P ratio. A companion experiment established that water-washing had little effect on O,O'-di-2-ethylhexyl phosphorodithioic acid.

EXAMPLE IX

O,O'-di-n-butyl phosphorodithioic acid was prepared by charging 296.5 g. (4.0 mols) of n-butyl alcohol and 360 ml. of toluene to a one-liter flask equipped with a motor-driven stirrer and thermometer. The flask was heated with a steam bath. Over a thirty-minute period, 222.3 g. (1.0 mol) of phosphorus pentasulfide was added to the reaction mixture as it was stirred and heated (90°–95° C.), and vigorous evolution of hydrogen sulfide occurred. After four hours of reaction at 90°–95° C., all solids had disappeared and it was considered that the reaction was complete. The product was filtered, the filtrate weighing 691 g. The product had an acid number of 142, indicating that 1.72 mols of acid had been formed, in comparison with 2.0 mols in theory. Analysis of product: theory, 9.0 wt. percent P, 18.6 wt. percent S; found: 9.0 percent P, 17.3 wt. percent S.

Three hundred twenty-one grams (0.93 mol according to theory; 0.81 mol according to acid number) of the O,O'-di-n-butyl phosphorodithioic acid and 259 g. (2.12 mols) of DL-alpha-methylbenzyl alcohol were charged to a one-liter flask equipped with motor-driven stirrer and thermometer, and mounted over steam. The reaction mixture was stirred for twenty hours at 90°–95° C. At the end of this time, the acidity of the product was essentially the same as that of the charge (as measured by acid number). The product was water-washed and separated from the wash water by centrifuging. The washed product was oil-soluble, weighed 378 g. and had an acid content of 0.23 mol, a considerable reduction from the 0.81 mol of acid in the charge (also measured by acid number). The product analyzed 11.5 wt. percent S and 5.1 wt. percent P to show a S/P ratio of 2.2/1.

EXAMPLE X

One hundred fifty-six grams (0.45 mol in theory, 0.40 mol by acid number) of O,O'-di-butyl phosphorodithioic acid, as prepared in Example IX, and 197.6 g. (1.618 mols) of tolylcarbinol (ring-substituted methylbenzyl alcohol) were charged to a liter flask equipped with motor-driven stirrer and thermometer, and mounted over steam. The reaction mixture was stirred for eighteen hours at 90°–95° C. At the end of this time, the product's acidity was somewhat higher (0.48 mol) than that of the charge (0.40 mol), as determined by acid number. The product was water-washed, and the oil-soluble product phase separated by centrifuging. The washed product weighed 235 g. and had an acid content of 0.13 mol (by acid number). The product analyzed 9.1 wt. percent S and 3.6 wt. percent P to show a S/P ratio of 2.4/1.

EXAMPLE XI

O,O'-dioctadecyl phosphorodithioic acid is prepared by reaction of octadecanol with phosphorus pentasulfide following the procedure of Example VIII. When the O,O'-dioctadecyl phosphorodithioic acid is reacted with benzyl alcohol as in Example XIII, the product which is obtained after water-washing is oil-soluble, of low acidity, and has a S/P ratio greater than 2.

EXAMPLE XII

O,O'-di-2-ethylhexyl phosphorodithioic acid is prepared as in Example VIII. The O,O'-di-2-ethylhexyl phosphorodithioic acid is reacted with hexadecylphenyl carbinol for 7 hours at 150° C. After water-washing, an oil-soluble product is obtained which has a low acid number and a S/P ratio greater than 2.

EXAMPLE XIII

O,O'-di-n-butyl phosphorodithioic acid is prepared as in Example IX and reacted with α-decylbenzyl alcohol for 35 hours at 130°–150° C. The product, after water-washing, is an oil-soluble oily liquid which has a low acid number and a S/P ratio greater than 2.

EXAMPLE XIV

O,O'-di-n-butyl phosphorodithioic acid is prepared as in Example VIII and reacted with o-chlorobenzyl alcohol for 8 hours at 120°–150° C. After water-washing, the product recovered is an oily, oil-soluble liquid having a low acid number and a S/P ratio greater than 2/1.

This process is generally operative for the formation of neutral esters by the reaction of benzyl alcohol and derivatives (either ring-substituted or alpha-substituted derivatives) thereof with any alkyl or aryl diester of phosphorodithioic acid. In carrying out this reaction, benzyl alcohol, or any derivative of benzyl alcohol containing functional groups which do not react with the acid ester may be used. Examples of these are alkyl- and aryl-substituted benzyl alcohols, such as ethylbenzyl alcohol, methylbenzyl alcohol, n-propylbenzyl alcohol, decylbenzyl alcohol, octadecylbenzyl alcohol, phenylbenzyl alcohol, and tolylbenzyl alcohol; halogenated benzyl alcohols, such as chlorobenzyl alcohol, dichlorobenzyl alcohol, bromobenzyl alcohol, and dibromobenzyl alcohol; and other benzyl alcohols containing inert substituents, such as nitrobenzyl alcohol, methoxybenzyl alcohol, and acetylbenzyl alcohol. In these substituted benzyl alcohols the substituents may be on the ring or hydrocarbon groups may be in the alpha position. Acid esters which may be reacted with the benzyl alcohol or derivative include O,O'-dimethyl phosphorodithioc acid, O,O'-dipropyl phosphorodithioic acid, O,O'-dioctyl phosphorodithioic acid, O,O'-dioctadecyl phosphorodithioic acid, O,O'-dibenzyl phosphorodithioic acid, O,O'-diphenyl phosphorodithioic acid, O,O'-dinaphthyl phosphorothioic acid, and O,O'-di(hexadecylphenyl) phosphorodithioic acid. In carrying out this process the only restriction on the molecular size of either of the reactants is that at least one of the reactants must be liquid in the temperature range from 20° to 160° C., and the functional group on the benzyl alcohol, if a substituted alcohol is used, must be inert toward the acid ester. In cases where the product and by-product are miscible, the by-product can be removed by water-washing.

The phosphorothioate ester compositions which are produced by this process have been found to exhibit unexpectedly superior properties when used as antiwear additives in lubricating oil compositions. These ester compositions (the neutral oily phase of the reaction product), when added to lubricating oil in the range of 0.005–1.0%, have been found to reduce wear of moving parts lubricated therewith to an unexpected degree. To demonstrate the superiority of lubricating compositions including small amounts of the products of this process, a number of lubricant compositions were prepared using a mineral lubricating oil base and various additives to demonstrate the antiwear properties thereof.

These oil compositions were tested for antiwear properties in a Four-Ball EP Test Apparatus following the procedure used in the evaluation of the antiwear additive prepared in accordance with Examples I to V.

To illustrate the significance of this wear test, a detergent lubricating oil was used consisting of 83.1 wt. percent of a solvent-refined 170 vis., 100 V.I. neutral oil, 4.8 wt. percent extract from the phenol extraction of 85 vis., 100 V.I. neutral oil stock, 5.7 wt. percent barium phenol sulfide-calcium sulfonate, and 6.4 wt. percent Acryloid 618 (acrylic polymer manufactured by Rohm and Haas, Inc.). This lubricating oil composition was evaluated for antiwear properties without any additive, and with various phosphorus- and sulfur-containing compounds added in concentration such that 0.1 wt. percent phosphorus was contained in each blend. In evaluating the performance of antiwear additives in lubricating oil compositions, various oil compositions were measured in the Four-Ball Test Apparatus and the size of the wear scars compared. Since the wear scar can never be smaller in diameter than the elastic indentation, the comparison of wear using different lubricants is best made by measuring the increase in scar diameter over the diameter of elastic indentation. Oils which have superior antiwear properties will, of course, produce scars having smaller increase in diameter than oils which do not provide wear protection. The results of several tests are shown in Table III as follows:

*Table III*

| Additive (In an amount sufficient to produce phosphorus concentration of 0.1%) | Average increase in scar diameter over initial diameter of elastic indentation, mm. $\times 10^3$ |
|---|---|
| None | 44 |
| O,O-diamyl phosphorodithioic acid | 48 |
| 1-phenylethyl O,O'-diamyl phosphorodithioate | 53 |
| Commercial zinc dialkyl phosphorodithioate composition | 37 |
| Product of Example VI | 35 |

The above data show quite clearly that the neutral phosphorothioate ester compositions produced by our process are exceptionally good antiwear additives for lubricating oil compositions. These esters are superior to several commercial antiwear additives and are easy to prepare. When these additives are added to mineral lubricating oils without any other additive present, the improvement in antiwear properties is proportionately as great or greater as that indicated in Table III.

The products of Examples IX and X were tested as antiwear agents in two test vehicles, (1) extract from the manufacture of 85 vis., 100 V.I. neutral, and (2) 170 vis., 100 V.I. neutral. The results of these tests are presented below in Tables IV and V. The additive was present in such concentration as to provide 0.1 wt. percent P in the blend compositions.

*Table IV*

[Base oil: Extract from manufacture of 85 vis., 100 V.I. neutral]

| | Average increase in scar diameter over initial diameter of indentation, mm. $\times 10^3$ |
|---|---|
| No additive | 287 |
| Product of Example IX | 68 |
| Product of Example X | 70 |

*Table V*

[Base oil: 170 vis., 100 V.I. neutral]

| | Average increase in scar diameter over initial diameter of indentation, mm. $\times 10^3$ |
|---|---|
| No additive | 144 |
| Product of Example IX | 115 |
| Product of Example X | 93 |

The data in Tables IV and V show the products of Examples IX and X have antiwear activity.

The products of Examples VII, VIII, XI, XII, XIII, and XIV also show similar wear protection when incorporated in a lubricating oil composition.

We have also found that antiwear lubricant additives may be prepared by reaction of phenol and mono- and dialkyl phenols with phosphorus pentasulfide and low-molecular-weight aldehydes, e.g., formaldehyde and other $C_1$–$C_7$ alkanals. When phenol or a substituted phenol and the aldehyde are reacted, there is formed an alkylol derivative of the phenol (which is a derivative of benzyl alcohol) which, when reacted with phosphorus pentasulfide in a mol ratio not less than about 4:1, undergoes some form of molecular rearrangement or disproportionation to produce an acid diester having a high sulfur/phosphorus ratio (instead of the expected S/P of 2.0). In most cases, the reaction also takes place when the three reactants are mixed together and heated to a temperature in the range from about 20° C. to the reflux temperature of the reaction mixture, as well as when the phenol and aldehyde are reacted prior to admixture with the phosphorus pentasulfide. The products of this reaction are novel compositions which have not previously been reported. As will become apparent, the product composition depends upon the starting reactants used. These reaction products impart unexpectedly high antiwear properties to lubricating oils when dissolved therein to the extent of about 0.005–1.0% by weight of phosphorus. The preparation of these compositions and their use in antiwear lubricant compositions is illustrated further in the following examples.

EXAMPLE XV

A reaction flask, equipped with a stirrer and thermometer, was charged with 40.1 g. (0.43 mol) of phenol, 6.6 g. of paraformaldehyde (equivalent to 0.22 mol of formaldehyde), 24.7 g. (0.11 mol) of phosphorus pentasulfide and 150 ml. of benzene (as liquid reaction medium). The reaction mixture was maintained at 26°–33° C., with stirring, for 132 hours. At the end of this period, the reaction mass was separated into liquid and solid phases. The solid was essentially unconsumed phosphorus pentasulfide, and was washed with pentane, dried, and weighed, the dried weight being 21.0 g. The filtrate and solvent washings were combined and most of the benzene was removed by distillation. After distilling off the benzene (and dissolved $H_2S$) a high-boiling, liquid residue was obtained which weighed 36.0 g. This liquid product had a total acidity equivalent to 0.04 mol of acid, and contained 2.2 wt. percent phosphorus and 7.5 wt. percent sulfur. Thus, the indicated S/P atomic ratio was 3.3, and the indicated acidity/phosphorus equivalent ratio was 1.6. In dialkyl phosphorodithioic acids, which are the expected products of the reaction of an alcohol or phenol and phosphorus pentasulfide, the S/P atomic ratio is 2 and the acidity/phosphorus equivalent ratio is 1. It was concluded that in our reaction some form of molecular disproportionation occurred which produced a mixture of different acid diesters, probably esters of phosphorotrithioic acids and phosphorotetrathioic acids of the formula

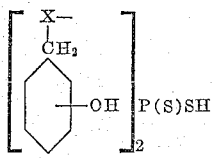

where the hydroxyl group may be in either the ortho- or para-position, and X is sulfur or oxygen with not more than one X oxygen. In this experiment, the recovery of phosphorus in the product was 77 wt. percent of that consumed in the reaction.

EXAMPLE XVI

In another experiment, the novel products of this invention were prepared by a two-step process. Methylolphenol (hydroxybenzyl alcohol) was prepared by dissolving 51.0 g. (1.28 mols) of sodium hydroxide in 540 ml. of water, and after allowing the solution to cool, adding to it 124.3 g. (1.32 mols) of phenol and 0.45 mol of formaldehyde (as formalin). The reaction mixture was then allowed to stand at room temperature for 24 hours, after which it was neutralized with a calculated, stoichiometric, amount of acetic acid. The resulting solution was extracted three times with ether, and the ether extract was steam-stripped to remove unreacted phenol. According to a publication by Granger, I and E.C., 24, 442–8, 1932, this preparation yields 33% of monomethylolphenols, consisting of a mixture of saligenin (ortho-hydroxybenzyl alcohol) and para-hydroxybenzyl alcohol. On this basis, it was assumed that 0.44 mol of methylolphenol was obtained for use as a reactant in the second step of the experiment.

In the second step of the experiment, in accordance with this invention, 200 ml. of benzene and 22.2 (0.10 mol) of phosphorus pentasulfide were placed in a 500 ml. flask equipped with stirrer and thermometer, and mounted over a steam bath. The methylolphenol (0.44 mol) produced in the first step was then added dropwise over a 20 minute period. The reaction continued for one hour, with stirring. The temperature was maintained at 72°–76° C. During the reaction period, there was a vigorous evolution of hydrogen sulfide. At the end of this reaction period, there were three distinct phases, two immiscible liquids and a solid. The solid was essentially unreacted phosphorus pentasulfide and was separated by filtration. After being washed and dried, the amount of unreacted phosphorus pentasulfide was found to be 11.0 g.

The liquid phases of the reaction product were separated and the upper phase was recovered as the product of this invention, and was weighed and analyzed. There were obtained 60.0 g. of this liquid which was found to have a total acidity of 0.04 mol, and contained 6.9% wt. sulfur and 1.7% wt. phosphorus. The phosphorus content of this product amounted to 32% of that consumed in the reaction. The sulfur/phosphorus atomic ratio was 3.9 and the acidity/phosphorus equivalent ratio was 1.2 This product is clearly distinguishable from diaryl phosphorodithioic acids (e.g., diphenyl phosphorodithioic acid) in that both the S/P atomic ratio and the acidity/phosphorus ratio are greater than the values found in such acids. It is also to be noted that the reaction of phenol and phosphorus pentasulfide to produce diphenyl phosphorodithioic acid requires about 17 hours to go to completion, whereas this reaction was half complete in only one hour, based on the amount of phosphorus pentasulfide consumed in this time. From the reactants used in this process and the analysis of the products, it is believed that the reaction product is a mixture of di-(hydroxybenzyl) phosphorothioic acids comprising a mixture of phosphorotrithioic acids and phosphorotetrathioic acids. The fact that the acidity ratio is slightly greater than 1 may indicate the presence of small amounts of dibasic phosphorothioic acids.

EXAMPLE XVII

When the procedure of Example XVI is followed substituting acetaldehyde for the formaldehyde in the first step, the initial reaction product obtained consists primarily of a mixture of hydroxy α-methylbenzyl alcohols (the α-methyl derivative of the methylolphenols produced in step 1 of Example XVI), e.g.,

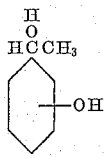

When this alkylolophenol product is reacted with phosphorus pentasulfide following the procedure of step 2 of Example XVI, a liquid product is obtained which is an acid diester of phosphorothioic acids, and has a sulfur/phosphorus atomic ratio in the range of 3–4/1 and an acidity/phosphorus equivalent ratio of about 1. The product probably includes the compound having the formula,

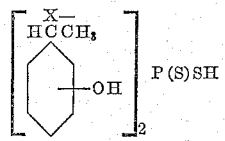

where the hydroxyl group is in the ortho- or para-position and X is oxygen or sulfur, at least one X being sulfur.

EXAMPLE XVIII

When the first step of Example XVI is repeated substituting n-pentanal for formaldehyde, the product obtained is the α-butyl derivative of the monomethylolphenol obtained in step 1 of Example II. When step 2 of Example XVI is carried out using these α-butyl derivatives of methylolphenol, a liquid product is obtained which comprises a mixture of diesters of phosphorothioic acids having a sulfur/phosphorus atomic ratio in the range of 3–4/1 and an acidity/phosphorus equivalent ratio of about 1. This product probably includes the compound having the formula,

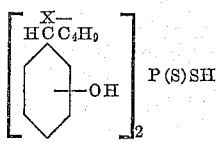

where the hydroxyl is in either the ortho- or para-position and X is oxygen or sulfur, at least one X being sulfur.

EXAMPLE XIX

In another experiment, 30 g. (1 mol) of formaldehyde and 22.3 g. of phosphorus pentasulfide were charged as a slurry with 300 ml. of benzene to a one-liter flask, equipped with sealed stirrer, thermometer, dropping funnel, and water-trap, under a reflux condenser. Then 117.2 g. (0.5) mol of 2, 4-di-t-amylphenol was diluted with 300 ml. of benzene and charged to the dropping funnel. The slurry was heated to reflux over steam with stirring and the benzene-diamylphenol solution was charged dropwise during a 35-minute period. The reaction was continued under reflux for 5 hours during which time some hydrogen sulfide evolved and 0.3–0.4 ml. of water was collected in the trap. At the end of the period, the product was filtered and 16 g. of unconsumed phosphorus pentasulfide was recovered. The filtrate was vacuum-nitrogen stripped to a weight of 151 g. Analysis of the product showed one equivalent of acid per phosphorus atom, a phosphorus content of 0.81 wt. percent and a sulfur content of 3.0 wt. percent corresponding to a sulfur/phosphorus atomic ratio of 3.6. The product probably included the compound having the formula,

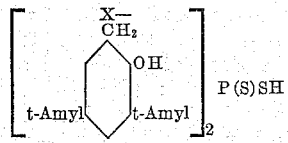

where X is oxygen or sulfur, at least one X being sulfur.

EXAMPLE XX

In another experiment, the two-step process was followed in preparing esters from the methylol derivative of 2,6-di-t-butylphenol. A beaker was charged with 0.5 mol of sodium hydroxide (10% aqueous solution), 0.5 mol of 2,6-di-t-butylphenol, 0.5 mol of formaldehyde (as formalin) and 600 ml. of methanol. The beaker was covered and methanol was added from time to time to keep the system in one phase. After 12 days' storage at room temperature, the reaction mixture was neutralized with a stoichiometric amount of hydrochloric acid. Water and benzene were then added to produce a two-phase system and the benzene phase separated. The aqueous phase was thoroughly washed with benzene and the washings added to the benzene phase. The composite benzene solution was then vacuum-nitrogen stripped. The product was further stripped by adding approximately one liter of toluene and then distilling the mixture with nitrogen under vacuum to effect complete removal of any traces of alcohol and water. The product obtained consisted of about 0.5 mol of methylol-2,6-di-t-butylphenol.

In the second step of the process, 13.6 g. (0.06 mol) of phosphorus pentasulfide and 0.24 mol of methylol-2,6-di-t-butylphenol were charged to a 500 ml. flask, equipped with a thermometer and motor-driven stirrer, and mounted over a steam bath. The reaction mixture was stirred at 90°–95° C. for 4 hours at the end of which time the reaction appeared to be complete. The product was analyzed and found to contain 1.6 wt. percent phosphorus, 5.0 wt. percent sulfur (corresponding to an S/P atomic ratio of 3.0), and an acid equivalent/phosphorus ratio of 0.7. The product probably included the compound having the formula,

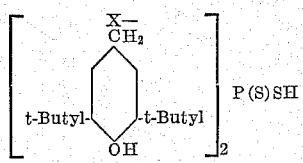

where X is oxygen or sulfur, at least one X being sulfur.

EXAMPLE XXI

In still another experiment, 0.036 mol of the product produced by reaction of 2,4-di-t-amylphenol, formaldehyde, and phosphorus pentasulfide, was reacted with 4.5 g. (0.036 mol) of benzyl chloride as follows. A mixture of the aforementioned reaction product and benzyl chloride, plus 150 ml. of benzene, were charged to a 500 ml. flask equipped with stirrer and a tube dipping below the liquid surface. Ammonia was distilled into the reaction mixture by the dip-tube while the mixture was stirred for a period of two hours. The reaction mixture was then stored at room temperature for 80 hours. After this time, a substantial amount of ammonium chloride was found to have precipitated. The liquid product was diluted with pentane and filtered. The pentane was then distilled from the filtrate and the residue analyzed. The product had an analysis corresponding to a yield of 60% of the neutral benzyl ester of the acid diester reactant used in the process.

The phosphorothioate ester compositions which are produced in accordance with the foregoing examples have been found to have unexpectedly superior properties when used as antiwear additives for lubricating oil compositions. The ester compositions prepared in accordance with Examples XV to XXI, when added to lubricating oils to produce a phosphorous concentration in the oil in the range of 0.005–1.0% wt. have been found to reduce the wear of moving parts lubricated therewith to an unexpected degree. To demonstrate the superiority of lubricating compositions including the small amounts of the products of the foregoing examples, a number of lubricant compositions were prepared using mineral lubricating oil and various reaction products as additives to demonstrate the antiwear properties thereof. These oil compositions were tested in the Four-Ball EP Test Apparatus under the conditions used in testing the products of the other examples. To illustrate the significance of this test, a number of runs were made using two different lubricating oil bases as lubricants for the balls in the Four-Ball Test Apparatus. In one series of runs, the lubricating oil base was a solvent refined 170 vis., 100 V.I. neutral oil, while in the other series of runs the lubricating oil was a phenol extract produced in the making of 85 vis., 100 V.I. neutral oil. In some of the runs a blank lubricating oil was used as a check, while in other runs the products of this invention were used as additives for the oil to determine the wear resistance imparted thereby. In each case, the additive was used in an amount producing a concentration corresponding to 0.1 wt. percent phosphorous in the oil. In evaluating the performance of these antiwear additives in the lubricating oils, various oil compositions were evaluated for their ability to produce resistance to wear in the Four-Ball Test Apparatus, and the sizes of the wear scars were compared. Since the wear scar can never be smaller in diameter than the elastic indentation, the comparison of wear using different lubricants is best made by measuring the increase in scar diameter over the diameter of elastic indentation. Oils which have superior antiwear properties will, of course, produce scars having a smaller increase in diameter than oils which do not provide wear protection. The results of a series of runs using the indicated lubricating oils, both with and without the additives, are reported in Table VI as follows:

Table VI

| Lubricant | No. Tests | Average increase in scar diameter over diameter of elastic indentation, mm. × $10^3$ |
|---|---|---|
| 170/100 Neutral Oil | 4 | 144 |
| 170/100 Neutral Oil plus additive 1 | 3 | 68 |
| Phenol extract from 85/100 Neutral Oil | 1 | 214 |
| Phenol extract from 85/100 Neutral Oil plus additive 2 | 3 | 39 |
| 170/100 Neutral Oil plus additive 3 | 3 | 77 |
| 170/100 Neutral Oil plus additive 4 | 1 | 110 |

Additive 1—Acid diester produced by reaction of 2,4,-di-t-amylphenol, formaldehyde and $P_2S_5$.
Additive 2—Acid diester produced by reaction of 2,6,-di-t-butylphenol, formaldehyde and $P_2S_5$, according to Example XX.
Additive 3—Neutral benzyl ester of additive 1 produced according to Example XXI.
Additive 4—Tribenzyl phosphorotetrathioate.

From the foregoing data, it is seen that the phosphorothioate esters produced in accordance with this invention are superior antiwear additives for lubricating oils. In fact, the esters of this invention are superior to a high-sulfur, neutral triester such as tribenzyl phosphorotetrathioate, as an antiwear additive. The neutral triesters produced in accordance with this invention are preferred as antiwear additives since they are relatively noncorrosive compounds.

While we have described this invention with emphasis upon several specific embodiments thereof, it should be understood that the scope of the invention is not limited to those specific embodiments. The compositions of this invention include lubricating oils containing phosphorothioate ester compositions derived from benzyl alcohol or substituted benzyl alcohol and having sulfur-to-phosphorus ratios in excess of 2.0. The various compositions which are useful in preparing antiwear lubricating oil compositions vary somewhat in accordance with the starting reactants, but we have found that the phosphorothioate esters prepared in accordance with the foregoing examples are useful in general as antiwear additives for lubricating oils. These products, both the neutral triesters and the acid diesters, are useful for inhibiting wear when added to lubricating oils to produce a phosphorus concentration of 0.005–1.0% wt. in solution in the oil. The lubricating compositions may use plain mineral lubricating oils as the base or may use oils containing other additives, such as detergents, corrosion inhibitors, other extreme-pressure additives, etc.

The embodiments of the invention in which an exclusive property or privilege is claimed are defined as follows:

1. A lubricant composition comprising a major proportion of lubricating oil and a wear-inhibiting amount of a phosphorus compound, at a phosphorus concentration of 0.005–1.0% wt., having a sulfur-to-phosphorus atomic ratio in excess of 2.0, produced by reaction of an acid ester of the formula $(RO)_2P(S)SH$, where R is a hydrocarbon radical, with an alcohol of the group consisting of benzyl alcohol and derivatives thereof containing functional groups which are inert toward said acid ester, at a temperature of 20–160° C.

2. A lubricant composition in accordance with claim 1 in which R is a $C_1$–$C_{18}$ hydrocarbon radical and the alcohol is from the group consisting of benzyl alcohol, alpha-alkyl benzyl alcohol and alkylphenyl carbinols.

3. A lubricant composition in accordance with claim 2 in which R is from the group consisting of ethyl, butyl, 2-ethylhexyl and phenyl.

4. A lubricant composition comprising a major proportion of lubricating oil and a wear-inhibiting amount of a phosphorus compound, at a phosphorus concentration of 0.005–1.0% wt., having a sulfur-to-phosphorus atomic ratio in excess of 2.0, produced by reaction of an acid ester of the formula $(RO)_2P(S)SH$, where R is a hydrocarbon radical, with an alcohol of the group consisting of benzyl alcohol and derivatives thereof containing functional groups which are inert toward said acid ester, at a temperature of 20–160° C., to produce a reaction product, resolving said reaction product into two phases, and recovering a neutral, water-insoluble, oil-soluble phase as said phosphorus compound.

5. A lubricant composition comprising a major proportion of lubricating oil and a wear-inhibiting amount of a phosphorus compound equivalent to a phosphorus concentration of 0.005–1.0% wt., said compound having an acid equivalent per atom of phosphorus of about 1 and a sulfur-to-phosphous atomic ratio of 3–4/1, and produced by reaction of phosphorus pentasulfide, a lower alkanal and a phenol in a mol ratio of 1:4:4 at temperatures ranging from room temperature to the reflux temperature of the reaction mixture.

6. A lubricant composition in accordance with claim 5 in which the lower alkanal is formaldehyde and it is reacted with the phenol to form a monomethylol derivative of the phenol and then reacted with the phosphorus pentasulfide.

7. A lubricant composition in accordance with claim 5 in which the lower alkanal is acetaldehyde and it is reacted with the phenol to form a monoalkylol derivative of the phenol and then reacted with the phosphorus pentasulfide.

8. A lubricant composition comprising a major proportion of lubricating oil and a wear-inhibiting amount of a phosphorus compound equivalent to a phosphorous concentration of 0.005–1.0% wt., said compound having an acid equivalent per atom of phosphorus of about 1 and a sulfur-to-phosphorus atomic ratio of 3–4/1, and produced by reaction of phosphorus pentasulfide with an alkylolphenol in a mol ratio of at least 4 of alkylol to 1 of phosphorus pentasulfide, at temperatures ranging from room temperature to the reflux temperature of the reaction mixture.

References Cited by the Examiner

UNITED STATES PATENTS

| | | | |
|---|---|---|---|
| 2,396,719 | 3/46 | Musselman et al. | 252—46.6 |
| 2,586,655 | 2/52 | Hook et al. | 252—46.6 |
| 2,603,600 | 7/52 | Smith et al. | 252—46.6 |

FOREIGN PATENTS

| | | |
|---|---|---|
| 586,333 | 3/47 | Great Britain. |

DANIEL E. WYMAN, *Primary Examiner.*
JULIUS GREENWALD, *Examiner.*

UNITED STATES PATENT OFFICE
CERTIFICATE OF CORRECTION

Patent No. 3,175,973　　　　　　　　　　　　March 30, 1965

Allen F. Millikan et al.

It is hereby certified that error appears in the above numbered patent requiring correction and that the said Letters Patent should read as corrected below.

Column 5, line 44, for "impact" read -- impart --; column 6, line 51, for "disphenyl" read -- diphenyl --; column 7, line 36, for "950 C." read -- 95° C. --; line 64, for "O,O'-di-butyl" read -- O,O'-di-n-butyl --; column 8, line 10, for "XIII" read -- VIII --; column 11, line 37, for "22.2" read -- 22.2 g. --; line 61, for "1.2" read -- 1.2. --; column 12, line 18, for "alkylolophenol" read -- alkylolphenol --.

Signed and sealed this 17th day of August 1965.

(SEAL)
Attest:

ERNEST W. SWIDER　　　　　　　　　　　　EDWARD J. BRENNER
Attesting Officer　　　　　　　　　　　　Commissioner of Patents